United States Patent
Sargenti, Jr. et al.

(10) Patent No.: US 7,006,316 B1
(45) Date of Patent: Feb. 28, 2006

(54) ESTIMATING A WRITER/READER GAP IN A DISK DRIVE BY MEASURING WRITE/READ TIMES RELATIVE TO A SYNC MARK

(75) Inventors: William A. Sargenti, Jr., Corona, CA (US); Khoa Xuan Bui, San Jose, CA (US); Teik E E Yeo, Trabuco Canyon, CA (US); Alvin W. Tan, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/919,839

(22) Filed: Aug. 16, 2004

(51) Int. Cl.
*G11B 5/09* (2006.01)
(52) U.S. Cl. .......................... 360/51; 48/53
(58) Field of Classification Search ............ None
See application file for complete search history.

(56) References Cited

U.S. PATENT DOCUMENTS

| | | | |
|---|---|---|---|
| 6,181,500 B1 | 1/2001 | Serrano et al. | |
| 6,252,732 B1 | 6/2001 | Chainer et al. | |
| 6,476,992 B1 | 11/2002 | Shimatani | |
| 6,510,017 B1 | 1/2003 | Abdelnour | |
| 6,633,451 B1 | 10/2003 | Chainer et al. | |
| 6,724,553 B1 | 4/2004 | Kim et al. | |
| 2002/0101672 A1 * | 8/2002 | Chainer et al. | 360/51 |
| 2002/0131191 A1 | 9/2002 | Osafune | |
| 2003/0002190 A1 | 1/2003 | Teo et al. | |
| 2004/0125491 A1 * | 7/2004 | Iseri et al. | 360/75 |
| 2004/0190174 A1 * | 9/2004 | Yoshida et al. | 360/51 |

* cited by examiner

*Primary Examiner*—David Hudspeth
*Assistant Examiner*—Daniell L. Negrón
(74) *Attorney, Agent, or Firm*—Howard H. Sheerin, Esq.

(57) ABSTRACT

A method of estimating a writer/reader gap in a disk drive is disclosed. During a first revolution of the disk, a clock is synchronized to a first preamble and used to measure a write delay to write a second sync mark to the disk relative to a first sync mark. During a second revolution of the disk, the clock is again synchronized to the first preamble and used to measure a read delay required to detect the second sync mark relative to the first sync mark. The writer/reader gap is then estimated in response to the measured write delay and the measured read delay, for example, by computing a difference between the measured write delay and the measured read delay.

24 Claims, 7 Drawing Sheets

ESTIMATING A WRITER/READER GAP IN A DISK DRIVE BY MEASURING WRITE/READ TIMES RELATIVE TO A SYNC MARK

BACKGROUND OF THE INVENTION

1. Field of the Invention

The present invention relates to disk drives for computer systems. More particularly, the present invention relates to a disk drive measuring a writer/reader gap in a disk drive by measuring write/read times relative to a sync mark.

2. Description of the Prior Art

Figure 1:
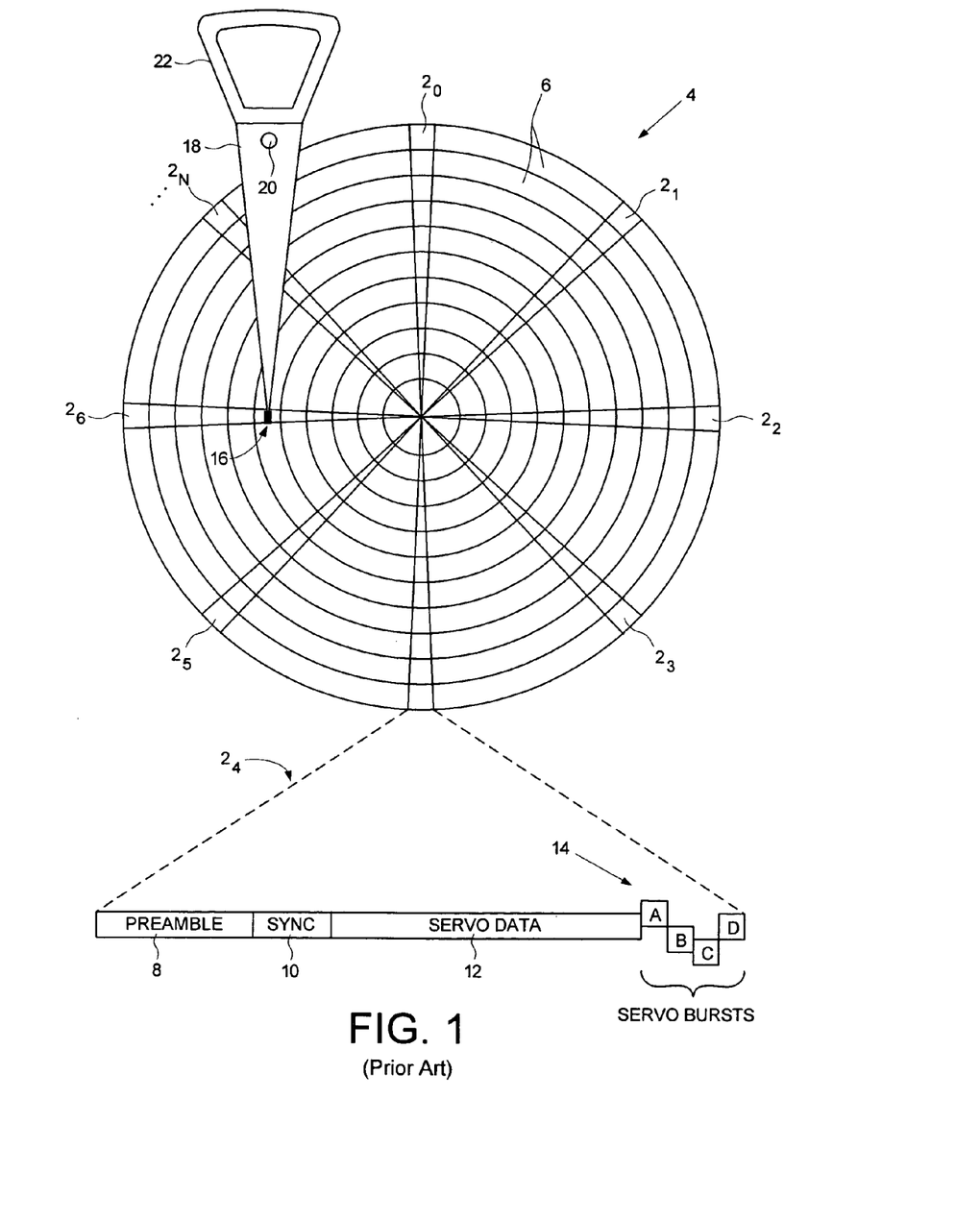
FIG. 1 shows a prior art disk drive comprising a head actuated over a disk by a voice coil motor rotating an actuator arm about a pivot, wherein the disk comprises a number of radially spaced, concentric data tracks having embedded servo sectors.

When manufacturing a disk drive, servo sectors $2_0$–$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$–$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head 16 over a target track during a seek operation, and the servo bursts 14 are processed to maintain the head 16 over a centerline of the target track while writing or reading data during a tracking operation.

The head 16 is coupled to a distal end of an actuator arm 18 which is rotated about a pivot 20 by a voice coil motor (VCM) formed from a voice coil 22 coupled to the base end of the actuator arm 18 and permanent magnets (not shown). When current is applied to the voice coil 22, the resulting magnetic flux interacts with the magnet flux of the permanent magnets to generate a rotational torque thereby rotating the actuator arm 18 about the pivot 20 to position the head 16 over a target data track.

Figure 2:
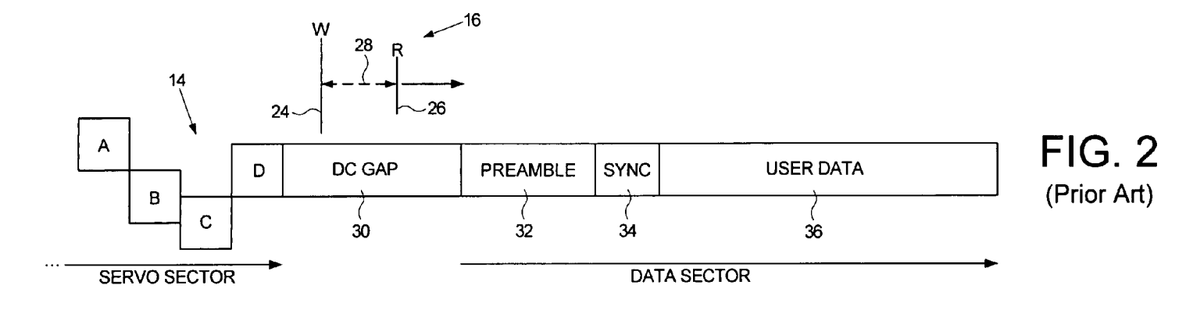
FIG. 2 shows a prior art format of a data track comprising an embedded servo sector and a data sector separated by a DC gap to account for the writer/reader gap of the head.

With certain heads, such as magnetoresistive (MR) heads, the writer is separated from the reader resulting in a writer/reader gap. This is illustrated in FIG. 2 which shows a head 16 comprising a writer 24 that is spatially separated along the length of a data track from a reader 26 forming a writer/reader gap 28. FIG. 2 also shows a prior art format of a data track including the servo bursts 14 (A, B, C, D) at the end of a servo sector, followed by a DC gap 30 preceding a data sector comprising a preamble 32, sync mark 34 and user data 36. In the embodiment of FIG. 2, the disk is rotating such that the data track moves under the head 16 from right to left which is the same as the head 16 moving from left to right over the data track. Thus, in this configuration the reader 26 is "in front" of the writer 24 such that the writer 24 "lags" the reader 26 by the writer/reader gap 28 as the data track passes under the head 16.

The writer/reader gap 28 varies from disk drive to disk drive due to various manufacturing tolerances. The length of the DC gap 30 is therefore selected to be long enough to ensure the servo bursts 14 are not overwritten when the preamble 32 of the following data sector is written. The length of the DC gap 30 is selected to account for the worst case (longest) writer/reader gap 28 (plus some margin). However, a long DC gap 30 reduces the format efficiency by consuming disk space that could otherwise be used for storing user data.

Figure 3:
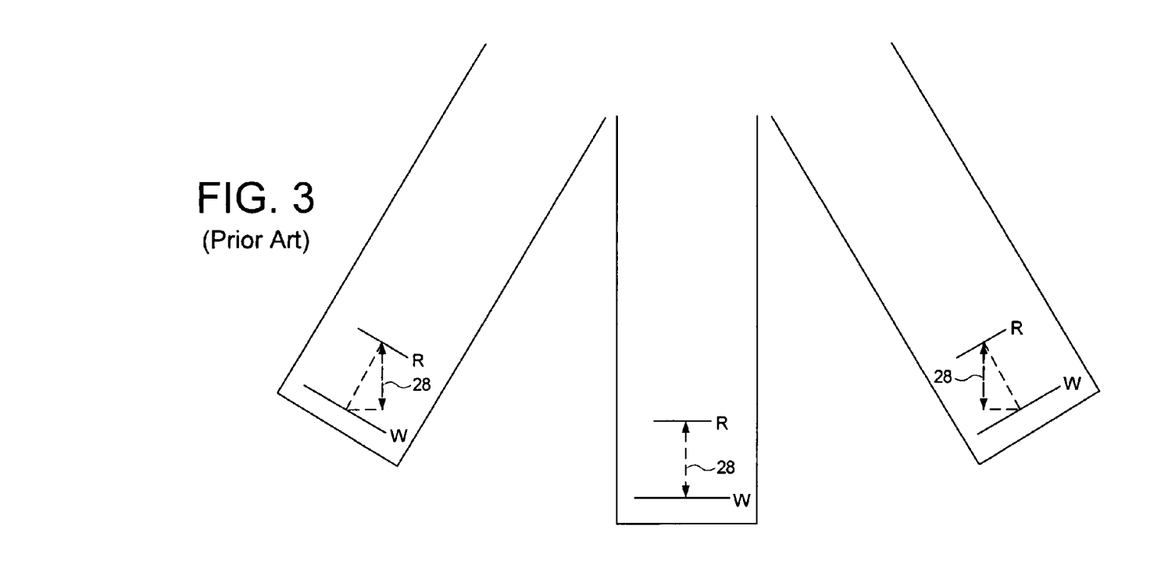
FIG. 3 illustrates how the length of writer/reader gap varies along the length of a data track over the stroke of the actuator arm.

The writer/reader gap 28 also creates uncertainty as to when to assert the read gate (read gate delay) to enable timing recovery to begin synchronizing to the preamble 32 of the data sector. Asserting the read gate too early causes timing errors due to timing recovery attempting to synchronize to the spurious data in DC gap 30. Asserting the read gate too late (too far into the preamble 32) may prevent timing recovery from fully synchronizing before encountering the sync mark 34. This problem is exacerbated by the varying length of writer/reader gap 28 along the length of the data track over the stroke of the actuator arm 18 (radial location of the head 16 from inner diameter to outer diameter) as illustrated in FIG. 3.

U.S. patent application Ser. No. 10/016,342 entitled "DISK DRIVE WITH OPTIMIZED READ GATE DELAY" discloses a technique for adjusting the read gate delay until the lowest bit error rate is achieved when reading a data sector following a servo sector. This technique, however, provides only a rough estimate of the writer/reader gap 28 since other factors also affect the bit error rate. Further, this technique only optimizes the read gate delay and does not optimize the length of the DC gap 30 (write gate delay) in order to increase format efficiency. Still further, relying on bit error rate measurements may take several revolutions (several retries) to obtain enough data for a reliable estimate. This can increase the manufacturing time since the optimal read gate delay must be estimated for multiple radial locations of the head 16 (e.g., for each zone on the disk) to account for the changes in the writer/reader gap 28 over the stroke of the actuator arm 18.

There is, therefore, a need to quickly and accurately measure the writer/reader gap in a disk drive in order, for example, to optimize the read gate delay and/or the write gate delay.

SUMMARY OF THE INVENTION

The present invention may be regarded as a method of estimating a writer/reader gap in a disk drive. The disk drive comprises a disk having a first preamble and a first sync mark, and a head actuated over the disk, wherein the head comprises a writer separated from a reader by the writer/reader gap. During a first revolution of the disk, a write delay is measured by reading the first preamble to synchronize cycling of a clock, reading and detecting the first sync mark, waiting a predetermined number of the clock cycles, writing a second preamble and a second sync mark on the disk, and counting a number of the clock cycles relative to when the first sync mark is detected and when the second sync mark is written. During a second revolution of the disk, a read delay is measured by reading the first preamble to synchronize cycling of the clock, reading and detecting the first sync mark, waiting a predetermined number of the clock cycles, reading the second preamble to synchronize cycling of the clock, reading and detecting the second sync mark, and counting a number of the clock cycles relative to when the first sync mark is detected and when the second sync mark is detected. The writer/reader gap is then estimated in response to the measured write delay and the measured read delay.

In one embodiment, the step of estimating the writer/reader gap comprises the step of computing a difference between the measured write delay and the measured read delay.

In another embodiment, the disk comprises a servo sector comprising the first preamble and the first sync mark. In one embodiment, the second preamble and second sync mark are written a predetermined number of the clock cycles after the end of the servo sector.

In yet another embodiment, the step of writing the second preamble and second sync mark comprises the step of clocking write circuitry with the clock.

In still another embodiment, the step of measuring the write delay by counting a number of the clock cycles comprises the step of starting a write delay counter after detecting the first sync mark and stopping the write delay counter after writing the second sync mark.

In another embodiment, the step of measuring the read delay by counting a number of the clock cycles further comprises the step of starting a read delay counter after detecting the first sync mark and stopping the read delay counter after detecting the second sync mark.

In yet another embodiment, the step of measuring the write delay by counting a number of the clock cycles comprises the step of asserting a write gate after a write gate delay determined from a number of the clock cycles after detecting the first sync mark. In one embodiment, the step of measuring the write delay by counting a number of the clock cycles further comprises the step of clearing the write gate after writing the second sync mark.

In another embodiment, the step of measuring the read delay by counting a number of the clock cycles comprises the step of asserting a read gate after a read gate delay determined from a number of the clock cycles after detecting the first sync mark. In one embodiment, the step of measuring the read delay by counting a number of the clock cycles further comprises the step of clearing the read gate a predetermined number of the clock cycles after detecting the first sync mark, and in one embodiment, the predetermined number of the clock cycles is decremented before clearing the read gate until the second sync mark is missed.

The present invention may also be regarded as a disk drive comprising a disk comprising a first preamble and a first sync mark, and a head actuated over the disk, wherein the head comprises a writer separated from a reader by a writer/reader gap. The disk drive further comprises control circuitry for estimating the writer reader gap. During a first revolution of the disk, a write delay is measured by reading the first preamble to synchronize cycling of a clock, reading and detecting the first sync mark, waiting a predetermined number of the clock cycles, writing a second preamble and a second sync mark on the disk, and counting a number of the clock cycles relative to when the first sync mark is detected and when the second sync mark is written. During a second revolution of the disk, a read delay is measured by reading the first preamble to synchronize cycling of the clock, reading and detecting the first sync mark, waiting a predetermined number of the clock cycles, reading the second preamble to synchronize cycling of the clock, reading and detecting the second sync mark, and counting a number of the clock cycles relative to when the first sync mark is detected and when the second sync mark is detected. The writer/reader gap is then estimated in response to the measured write delay and the measured read delay.

PREFERRED EMBODIMENTS

Figures 4A, 4C:
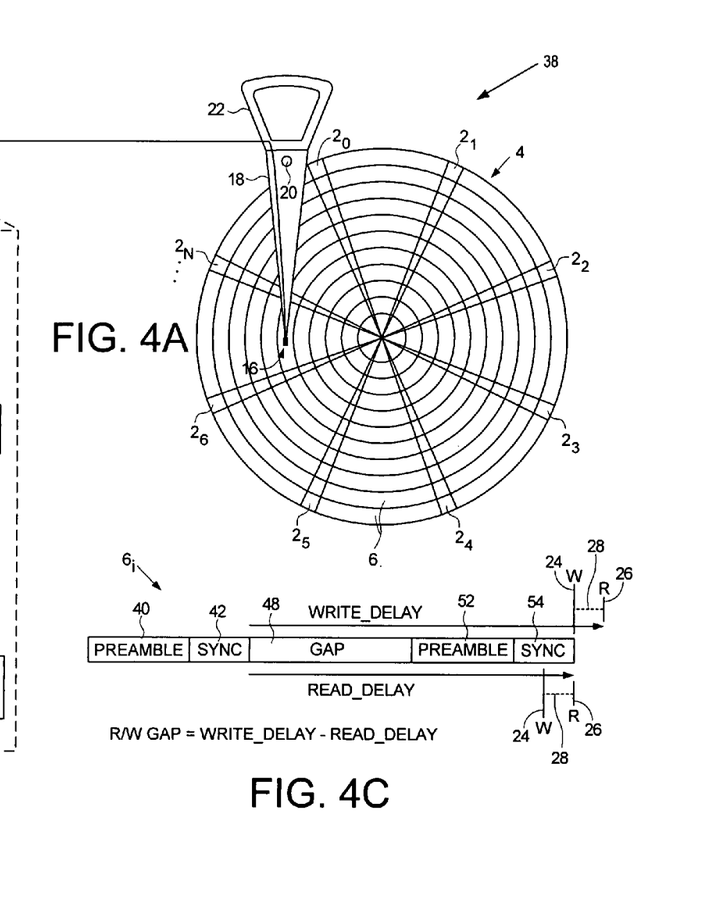
FIGS. 4A–4C show an embodiment of the present invention for estimating the writer/reader gap by measuring a write delay and a read delay relative to a first and second sync marks.
Figure 4B:
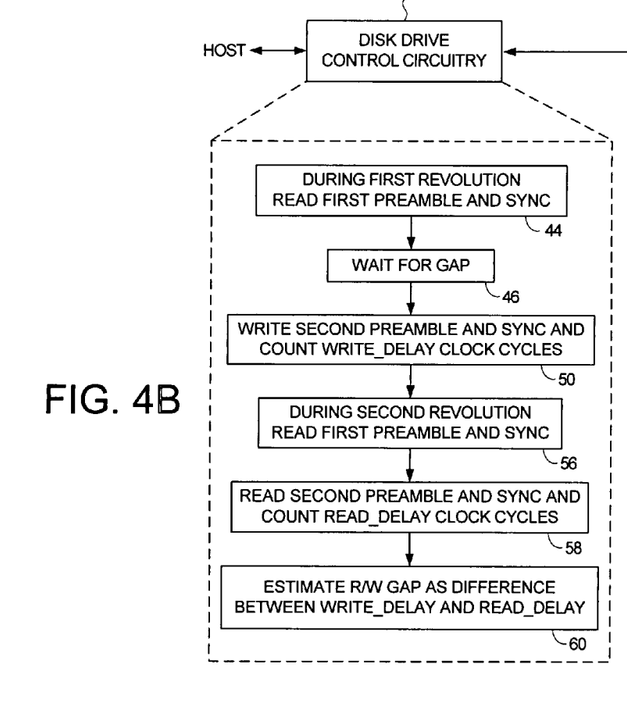

FIGS. 4A–4C illustrate an embodiment of the present invention for estimating a writer/reader gap 28 in a disk drive 38. The disk drive 38 comprises a disk 4 having a first preamble 40 and a first sync mark 42 (FIG. 4C), and a head 16 actuated over the disk 4, wherein the head 16 comprises a writer 24 separated from a reader 26 by the writer/reader gap 28. Referring to FIG. 4B, a write delay is measured during a first revolution of the disk 4. At step 44, the first preamble 40 is read to synchronize cycling of a clock, and the first sync mark 42 is detected. At step 46, a delay of a predetermined number of the clock cycles creates a gap 48 after the first sync mark 42 (FIG. 4C). At step 50, a second preamble 52 and a second sync mark 54 are written on the disk 4, and a number of the clock cycles are counted relative to when the first sync mark 42 is detected and when the second sync mark 54 is written. During a second revolution of the disk 4 a read delay is measured. At step 56, the first preamble 40 is read to synchronize cycling of the clock, and the first sync mark 42 is detected. After waiting a predetermined number of the clock cycles, at step 58 the second preamble 52 is read to synchronize cycling of the clock, the second sync mark 54 is detected, and a number of the clock cycles are counted relative to when the first sync mark 42 is detected and when the second sync mark 54 is detected. At step 60, the writer/reader gap 28 is then estimated in response to the measured write delay and the measured read delay.

In the embodiment of FIG. 4C, the disk 4 is rotating such that the head 16 is effectively moving from left to right over the track $6_i$, and in this configuration, the reader 26 is "in front" of the writer 24 such that the writer 24 "lags" the reader 26 by the writer/reader gap 28 as the data track $6_i$ passes under the head 16. Since the reader 26 detects the first sync mark 42 and the second sync mark 54, the write delay and the read delay are measured relative to the reader 26. In the example of FIG. 4C, the write delay begins at the end of the first sync mark 42 (relative to the reader 26) and ends after writing the second sync mark 54 (when the writer 24 has finished writing the second sync mark 54). The read delay begins at the end of the first sync mark 42 and ends when the reader 26 reaches the end of the second sync mark 54. In this embodiment, the writer/reader gap 28 is estimated by subtracting the measured read delay from the measured write delay.

Computing the difference between a write delay and a read delay relative to a reference sync mark and a secondary sync mark provides a fast and accurate estimate of the write/reader gap 28 in as little as two revolutions of the disk 4. Other embodiments may use additional revolutions of the disk 4, for example, to erase the track 6, prior to writing the second sync mark 54, or taking multiple write/read delay measurements to improve reliability. In one embodiment, the estimation procedure is repeated over a number of radial locations of the head 16 to account for the change in the writer/reader gap 28 along the length of a track over the stroke of the actuator arm 18 as described above with reference to FIG. 3. The writer/reader gap 28 could be estimated for every track 6 on the disk 4, or estimated for a select number of tracks 6 and then interpolated to generate an estimate for the remaining tracks 6.

The write/read delays are measured relative to the first sync mark 42 and the second sync mark 54 in any suitable manner. In the embodiment of FIG. 4C, the write/read delays are measured from the end of the first sync mark 42, however, the starting point is arbitrary and may be measured from any point after synchronizing the clock to the first preamble 40. In addition, the pipeline delay in detecting the first and second sync marks could be incorporated into the equation for estimating the writer/reader gap 28.

Figure 5:
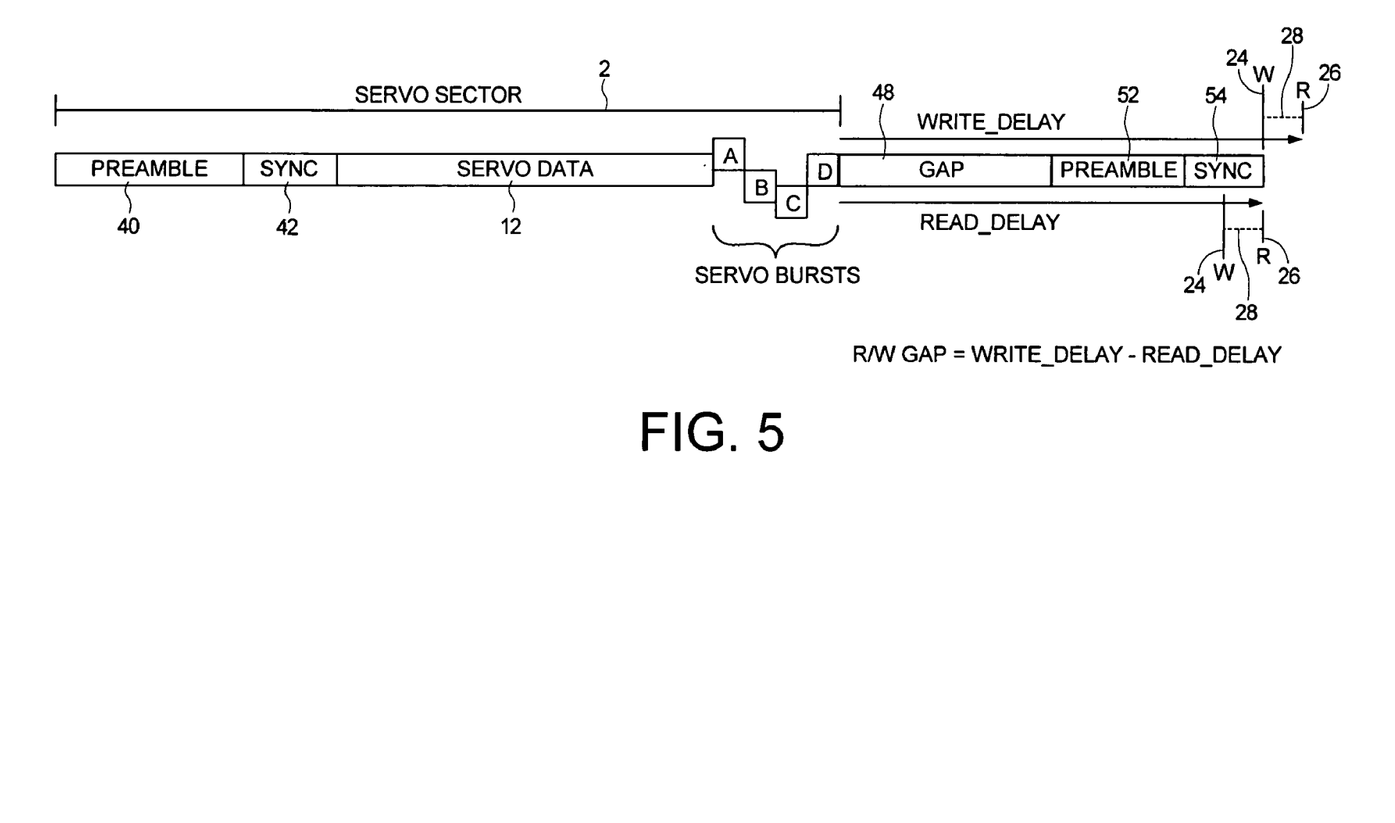
FIG. 5 shows an embodiment of the present invention wherein the first sync mark is the sync mark of a servo sector, and the second sync mark is written after the servo sector.

The first preamble 40 and first sync mark 42 may be written at any suitable location on the disk 4 and in any suitable manner. In one embodiment, the first preamble 40 and first sync mark 42 are written in the user data area of the disk (e.g., as part of a user data sector). In an alternative embodiment shown in FIG. 5, the first preamble 40 and first sync mark 42 are written to the disk 4 as part of a servo sector 2 during a servo writing operation. The servo sectors 2 may be written to the disk 4 using an external servo writer, stamped to the disk 4 using a magnetic printing technique, or written to the disk 4 using a self-servo writing technique. Also in the embodiment of FIG. 5, the write/read delays are measured from the end of the servo sector 2 (i.e., the end of the D servo burst) which is determined from the clock relative to the first sync mark 42. In one embodiment, the disk drive 38 comprises control circuitry 62 (FIG. 4A) that includes a servo read channel for generating the clock used to demodulate the servo sectors (including the first preamble 40 and first sync mark 42) as well as write/read the second preamble 52 and second sync mark 54 when estimating the writer/reader gap 28.

The write/read delays can be measured using any suitable technique. In an embodiment shown in FIG. 6, the disk drive control circuitry 62 comprises dedicated circuitry for measuring the write/read delays. For example, the dedicated circuitry of FIG. 6 may be included in a user data read channel for demodulating user data sectors, into a servo read channel for demodulating servo sectors, or included generally in a "system on chip" (SOC). The circuitry of FIG. 6 comprises a sampling device 64 for sampling a read signal 66 emanating from the head 16 to generate a sequence of signal samples 68. Timing recovery 70 processes the signal samples 68 to generate a timing control signal 72 applied to an oscillator 74. The oscillator 74 outputs a clock 76 used to control the frequency of the sampling device 64. Timing recovery 70 adjusts the frequency of the clock 76 until the read signal 66 is sampled synchronously (thereby synchronizing the cycling of the clock 76 when reading the first preamble 40 and the second preamble 52). A sequence detector 78 processes the signal samples 68 to detect an estimated sequence 80, and a sync mark detector 82 evaluates the estimated sequence 80 to detect the first sync mark 42 and the second sync mark 54. Timing recovery 70 enables the sync mark detector 82 over line 84 when the sync marks are expected to occur in the estimated sequence 80.

Figure 6:
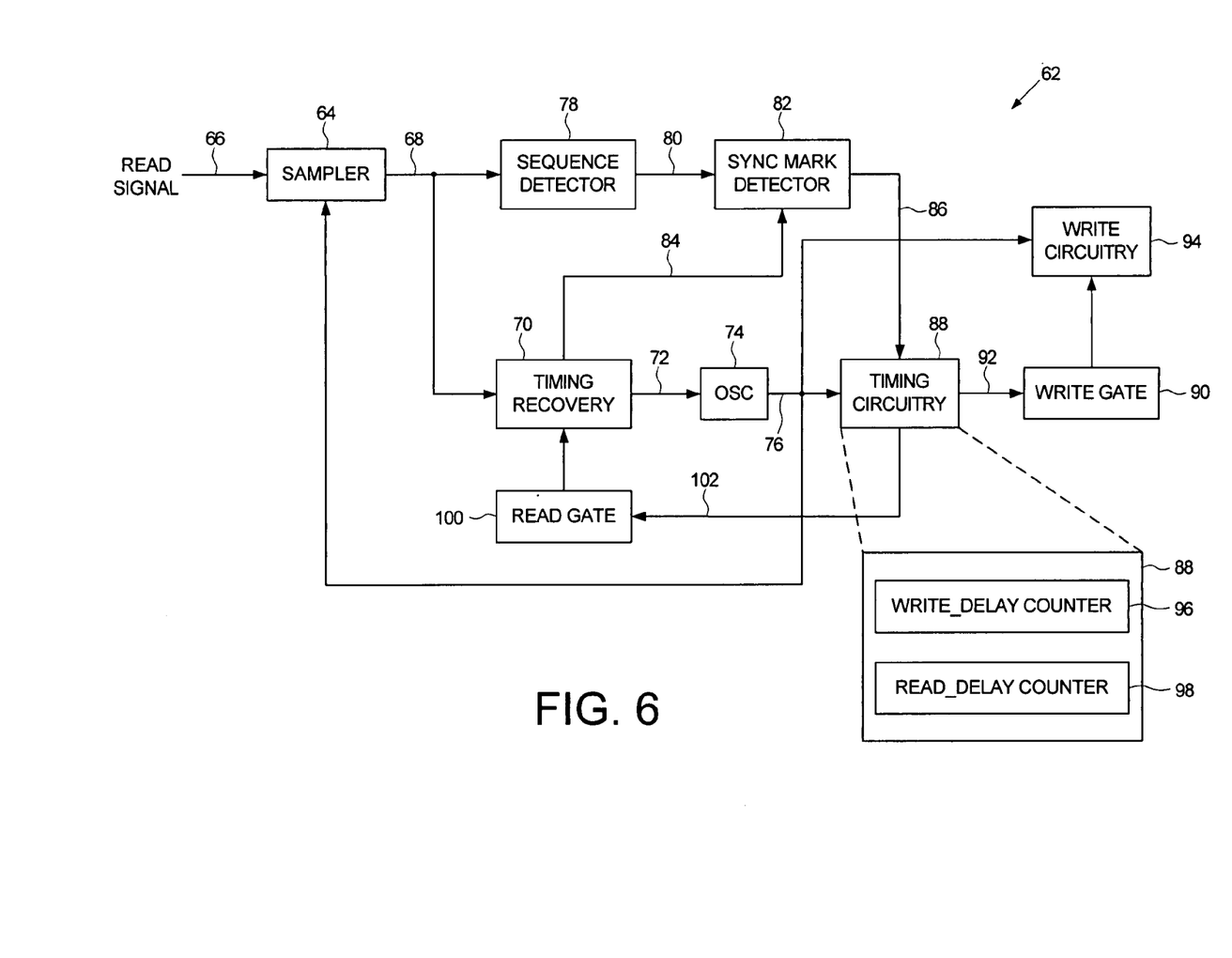
FIG. 6 shows control circuitry according to an embodiment of the present invention including timing circuitry for measuring the write delay and the read delay for estimating the writer/reader gap.

During the first revolution when writing the second preamble 52 and second sync mark 54 to measure the write delay, the sync mark detector 82 generates a control signal 86 when the first sync mark 40 is detected. Timing circuitry 88 responds to the sync mark detect signal 86 by enabling a write gate 90 over line 92 at the appropriate time relative to the clock 76. The write gate 90 enables write circuitry 94 to start writing the second preamble 52 and second sync mark 54. The timing circuitry 88 comprises a write delay counter 96 for counting a number of the clock cycles 76 relative to the first sync mark 42 until the second sync mark 54 has been written to the disk 4.

During the second revolution when reading the second preamble 52 and second sync mark 54 to measure the read delay, the sync mark detector 82 generates a control signal 86 when the first sync mark 40 is detected. The timing circuitry 88 responds to the sync mark detect signal 86 by enabling a read delay counter 98 and enabling a read gate 100 over line 102 at the appropriate time relative to the clock 76 as the head 16 approaches the second preamble 52. The read gate 98 enables the timing recovery 70 to start synchronizing to the second preamble 52, and the timing recovery 70 enables the sync mark detector 82 over line 84 as the head 16 approaches the second sync mark 54. The read delay counter 98 counts a number of the clock cycles 76 until the second sync mark 54 is detected by the sync mark detector 82. The contents of the write delay counter 96 and read delay counter 98 represents the write delay and read delay for estimating the writer/reader gap 28.

In the embodiment of FIG. 6, the clock 76 is used to clock the write circuitry 94 when writing the second preamble 52 and second sync mark 54 to the disk 4. In this manner the second preamble 52 and second sync mark 54 are written substantially synchronous (in frequency and phase) with the first preamble 50 and the first sync mark 42. In an alternative embodiment, a separate write clock is used to clock the write circuitry 94 while writing the second preamble 52 and second sync mark 54 to the disk 4.

The embodiment of FIG. 6 generates the clock 76 by synchronously sampling the read signal 66, that is, by adjusting the frequency of the clock 76 until the sampling device 64 samples the read signal 66 synchronously. In alternative embodiment, interpolated timing recovery is employed wherein the read signal 66 is sampled asynchronously and synchronous signal samples derived from the asynchronous signal samples. In this embodiment, the interpolated timing recovery also comprises circuitry for generating the clock 76 synchronously for writing/reading the second preamble 52 and second sync mark 54. The details of interpolated timing recovery are well known and not disclosed herein so as not to obscure the embodiments of the present invention.

Figure 7:
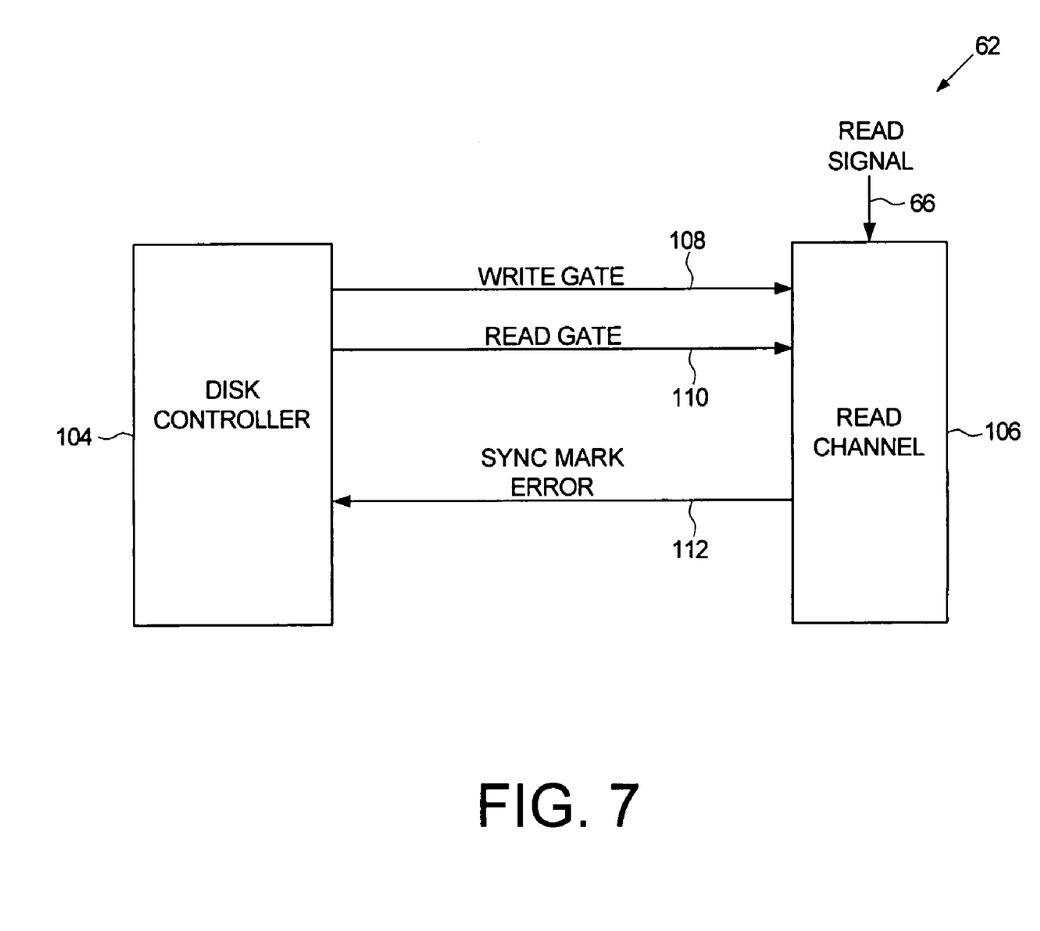
FIG. 7 shows an embodiment of the present invention wherein the disk drive comprises a disk controller and a read channel, wherein the disk controller programs a write gate and a read gate to measure the write delay and read delay.

FIG. 7 discloses an alternative embodiment for measuring the write/read delays without the use of dedicated timing circuitry 88 as in the embodiment of FIG. 6. That is, this embodiment measures the write/read delays using conventional control circuitry, such as a conventional disk controller 104 and a conventional read channel 106 (user data read channel or servo read channel). The disk controller 104 programs the read channel 106 with write gate timing signals 108 and read gate timing signals 110, and the read channel 106 generates a sync mark error signal 112 to notify the disk controller 104 when a sync mark has been missed.

Figure 8A:
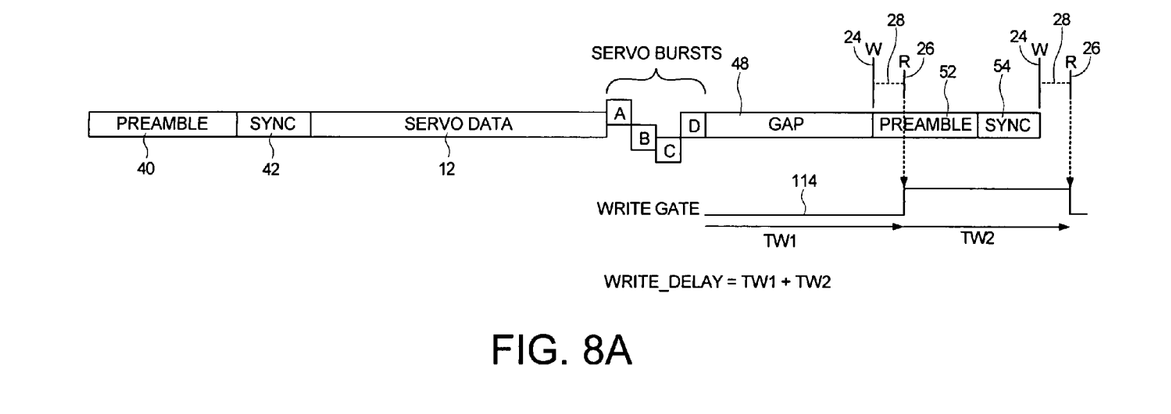
FIG. 8A shows an embodiment of the present invention for measuring the write delay by adding a write gate delay to a write gate duration.
Figure 8B:
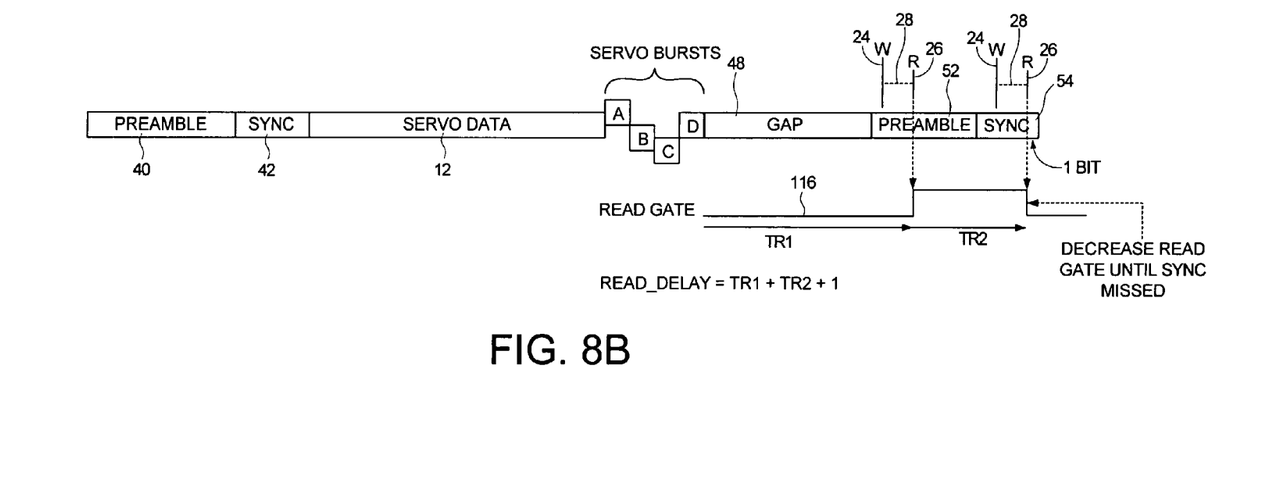
FIG. 8B shows an embodiment of the present invention for measuring the read delay by adding a read gate delay to a read gate duration, and by decrementing the read gate duration until the second sync mark is missed.

Referring to FIG. 8A, during the first revolution of the disk 4 the disk controller 104 configures the read channel 106 with a write gate delay TW1 representing a delay (in a number of clock cycles) before enabling a write gate signal 114, and a write gate duration TW2 representing the duration (in a number of clock cycles) for writing the second preamble 52 and second sync mark 54 to the disk 4, wherein the write gate signal 114 is cleared at the end of the write gate duration TW2. The write delay is then computed as the addition of the write gate delay TW1 and the write gate duration TW2. Referring to FIG. 8B, during the second revolution of the disk 4 the disk controller 104 configures the read channel 106 with a read gate delay TR1 representing a delay (in a number of clock cycles) before enabling a read gate signal 116, and a read gate duration TR2 representing a duration (in a number of clock cycles) for reading the second preamble 52 and second sync mark 54, wherein the read gate signal 116 is cleared at the end of the read gate duration TR2. Initially, the read gate duration TR2 is configured to extend significantly beyond the second sync mark 54 to ensure that the second sync mark 54 is detected before the read gate signal 116 is cleared. Over subsequent revolutions of the disk 4, the read gate duration TR2 is decremented until the second sync mark 54 is missed, that is, until the read gate signal 116 is cleared one clock cycle too early. The read delay is then computed as the addition of the read gate delay TR1 and the read gate duration TR2 plus one clock cycle corresponding to the last bit of the second sync mark 54 that was missed.

We claim:

1. A method of estimating a writer/reader gap in a disk drive, the disk drive comprising a disk having a first preamble and a first sync mark, and a head actuated over the disk, wherein the head comprises a writer separated from a reader by the writer/reader gap, the method comprising the steps of:
   (a) measuring a write delay during a first revolution of the disk by:
      reading the first preamble to synchronize cycling of a clock;
      reading and detecting the first sync mark;
      waiting a predetermined number of the clock cycles;
      writing a second preamble and a second sync mark on the disk; and
      counting a number of the clock cycles relative to when the first sync mark is detected and when the second sync mark is written;
   (b) measuring a read delay during a second revolution of the disk by:
      reading the first preamble to synchronize cycling of the clock;
      reading and detecting the first sync mark;
      waiting a predetermined number of the clock cycles;
      reading the second preamble to synchronize cycling of the clock;
      reading and detecting the second sync mark; and
      counting a number of the clock cycles relative to when the first sync mark is detected and when the second sync mark is detected; and
   (c) estimating the writer/reader gap in response to the measured write delay and the measured read delay.

2. The method as recited in claim 1, wherein the step of estimating the writer/reader gap comprises the step of computing a difference between the measured write delay and the measured read delay.

3. The method as recited in claim 1, wherein the disk comprises a servo sector comprising the first preamble and the first sync mark.

4. The method as recited in claim 3, wherein the second preamble and second sync mark are written a predetermined number of the clock cycles after the end of the servo sector.

5. The method as recited in claim 1, wherein the step of writing the second preamble and second sync mark comprises the step of clocking write circuitry with the clock.

6. The method as recited in claim 1, wherein the step of measuring the write delay by counting a number of the clock cycles comprises the step of starting a write delay counter after detecting the first sync mark and stopping the write delay counter after writing the second sync mark.

7. The method as recited in claim 1, wherein the step of measuring the read delay by counting a number of the clock cycles further comprises the step of starting a read delay counter after detecting the first sync mark and stopping the read delay counter after detecting the second sync mark.

8. The method as recited in claim 1, wherein the step of measuring the write delay by counting a number of the clock cycles comprises the step of asserting a write gate after a write gate delay determined from a number of the clock cycles after detecting the first sync mark.

9. The method as recited in claim 8, wherein the step of measuring the write delay by counting a number of the clock cycles further comprises the step of clearing the write gate after writing the second sync mark.

10. The method as recited in claim 1, wherein the step of measuring the read delay by counting a number of the clock cycles comprises the step of asserting a read gate after a read gate delay determined from a number of the clock cycles after detecting the first sync mark.

11. The method as recited in claim 10, wherein the step of measuring the read delay by counting a number of the clock cycles further comprises the step of clearing the read gate a predetermined number of the clock cycles after detecting the first sync mark.

12. The method as recited in claim 11, wherein the step of measuring the read delay by counting a number of the clock cycles further comprises the step of decrementing the predetermined number of the clock cycles before clearing the read gate until the second sync mark is missed.

13. A disk drive comprising:
   (a) a disk comprising a first preamble and a first sync mark;
   (b) a head actuated over the disk, wherein the head comprises a writer separated from a reader by a writer/reader gap; and
   (c) control circuitry for estimating the writer/reader gap by:
      measuring a write delay during a first revolution of the disk by:
         reading the first preamble to synchronize cycling of a clock;
         reading and detecting the first sync mark;
         waiting a predetermined number of the clock cycles;
         writing a second preamble and a second sync mark on the disk; and
         counting a number of the clock cycles relative to when the first sync mark is detected and when the second sync mark is written:

measuring a read delay during a second revolution of the disk by:
reading the first preamble to synchronize cycling of the clock;
reading and detecting the first sync mark;
waiting a predetermined number of the clock cycles;
reading the second preamble to synchronize cycling of the clock;
reading and detecting the second sync mark; and
counting a number of the clock cycles relative to when the first sync mark is detected and when the second sync mark is detected; and
estimating the writer/reader gap in response to the measured write delay and the measured read delay.

14. The disk drive as recited in claim 13, wherein the control circuitry estimates the writer/reader gap by computing a difference between the measured write delay and the measured read delay.

15. The disk drive as recited in claim 13, wherein the disk comprises a servo sector comprising the first preamble and the first sync mark.

16. The disk drive as recited in claim 15, wherein the control circuitry writes the second preamble and second sync mark a predetermined number of the clock cycles after the end of the servo sector.

17. The disk drive as recited in claim 13, wherein the control circuitry comprises write circuitry, and the control circuitry writes the second preamble and second sync mark by clocking the write circuitry with the clock.

18. The disk drive as recited in claim 13, wherein the control circuitry counts the number of clock cycles to measure the write delay by starting a write delay counter after detecting the first sync mark and stopping the write delay counter after writing the second sync mark.

19. The disk drive as recited in claim 13, wherein the control circuitry counts the number of clock cycles to measure the read delay by starting a read delay counter after detecting the first sync mark and stopping the read delay counter after detecting the second sync mark.

20. The disk drive as recited in claim 13, wherein the control circuitry counts the number of clock cycles to measure the write delay by asserting a write gate after a write gate delay determined from a number of the clock cycles after detecting the first sync mark.

21. The disk drive as recited in claim 20, wherein the control circuitry counts the number of clock cycles to measure the write delay by clearing the write gate after writing the second sync mark.

22. The disk drive as recited in claim 13, wherein the control circuitry counts the number of clock cycles to measure the read delay by asserting a read gate after a read gate delay determined from a number of the clock cycles after detecting the first sync mark.

23. The disk drive as recited in claim 22, wherein the control circuitry counts the number of clock cycles to measure the read delay by clearing the read gate a predetermined number of the clock cycles after detecting the first sync mark.

24. The disk drive as recited in claim 23, wherein the control circuitry counts the number of clock cycles to measure the read delay by decrementing the predetermined number of the clock cycles before clearing the read gate until the second sync mark is missed.

* * * * *

UNITED STATES PATENT AND TRADEMARK OFFICE
CERTIFICATE OF CORRECTION

| | | |
|---|---|---|
| PATENT NO. | : 7.006,316 B1 | |
| APPLICATION NO. | : 10/919839 | |
| DATED | : February 28, 2006 | |
| INVENTOR(S) | : Sargenti, Jr. et al. | |

It is certified that error appears in the above-identified patent and that said Letters Patent is hereby corrected as shown below:

On the title page: Item [75] Column 1, Inventor's should read "Teik EE Yeo".

Signed and Sealed this

Twenty-ninth Day of August, 2006

JON W. DUDAS
*Director of the United States Patent and Trademark Office*